United States Patent [19]

Keirs et al.

[11] Patent Number: 5,279,654
[45] Date of Patent: Jan. 18, 1994

[54] PHTHALOCYANINE PIGMENT COMPOSITIONS

[75] Inventors: David Keirs, Paisley; Robert Langley, Newton Mearns; Ian A. Lambie, Glasgow, all of Scotland

[73] Assignee: Ciba-Geigy Corporation, Ardsley, N.Y.

[21] Appl. No.: 916,931

[22] Filed: Jul. 20, 1992

[30] Foreign Application Priority Data

Jul. 27, 1991 [GB] United Kingdom ............... 9116240

[51] Int. Cl.⁵ .................. C09B 11/02; C09B 67/50
[52] U.S. Cl. .................. 106/20 R; 106/411; 106/413; 106/499
[58] Field of Search ............ 540/133, 132; 106/410–413, 499, 20

[56] References Cited

U.S. PATENT DOCUMENTS

| | | | |
|---|---|---|---|
| 2,861,005 | 11/1958 | Siegel | 106/411 |
| 3,067,053 | 12/1962 | Tarantino | 106/410 |
| 3,288,621 | 11/1966 | Barron | 106/411 |
| 3,920,469 | 11/1975 | Kienzle et al. | 106/411 |
| 4,221,606 | 9/1980 | Funatsu | 106/411 |
| 4,350,534 | 9/1982 | Fechner et al. | 106/411 |
| 4,370,144 | 1/1983 | Skelly et al. | 8/501 |
| 4,404,036 | 9/1983 | Donegan | 106/308 M |
| 4,427,810 | 1/1984 | Chisvette et al. | 524/88 |
| 4,726,847 | 2/1988 | Wanser | 106/308 N |
| 4,909,853 | 3/1990 | Wienkerhöver et al. | 106/503 |

FOREIGN PATENT DOCUMENTS

| | | | |
|---|---|---|---|
| 221466 | 5/1987 | European Pat. Off. | C09B 67/04 |
| 1544839 | 4/1979 | United Kingdom | |

*Primary Examiner*—Helene Klemanski
*Assistant Examiner*—Margaret Einsmann
*Attorney, Agent, or Firm*—Luther A. R. Hall; George R. Dohmann

[57] ABSTRACT

A pigment composition comprising (A) a pigmentary phthalocyanine, (B) a phthalocyanine derivative of formula

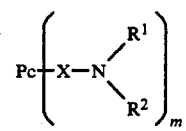

I where Pc is a residue of a metal-free or metal phthalocyanine, X is $-CH_2-$ or $-SO_2-$, $R^1$ and $R^2$ are independently hydrogen, $C_1-C_{20}$ alkyl optionally substituted by hydroxyl, $C_1$ to $C_4$ alkoxy, amino, $C_1$ to $C_{10}$ alkylamino or di($C_1$ to $C_{10}$ alkyl)amino, $C_5$ to $C_{10}$ cycloalkyl, or phenyl optionally substituted by $C_1$ to $C_4$ alkyl, $C_1$ to $C_4$ alkoxy or halogen, or $R^1$ and $R_2$ together with the indicated nitrogen atom denote a five-, six- or seven-membered heterocyclic ring, or $R^1$ and $R^2$ together denote a group of formula

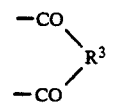

II $R^3$ is an o-phenylene group optionally substituted by $C_1$ to $C_4$ alkyl, $C_1$ to $C_4$ alkoxy, nitro or halogen, and m has an average value of 1 to 5, and (C) at least one anionic surfactant selected from (i) a monovalent metal or ammonium salt of an organic sulfonic acid, (ii) a sulfate half-ester of an alcohol or a monovalent metal or ammonium salt thereof, (iii) a sulfosuccinic acid ester or a monovalent metal or ammonium salt thereof, (iv) a sulfosuccinamic acid or a monovalent metal or ammonium salt thereof or (v) an aminosulfonic acid or a monovalent metal or ammonium salt thereof.

20 Claims, No Drawings

PHTHALOCYANINE PIGMENT COMPOSITIONS

This invention relates to pigment compositions, particularly phthalocyanine pigment compositions, and their use.

Phthalocyanine pigments are widely used in surface coating compositions such as printing inks. The use of phthalocyanines having basic substituents as anti-flocculation additives for phthalocyanine pigments in such compositions is known. Pigment formulations incorporating basic phthalocyanine derivatives in the form of their salts with sulphonic acids are known, for example from GB 1544839. Pigment formulations containing a mixture of a basic phthalocyanine derivative with a sulphonic acid or a polyvalent metal salt of an anionic surfactant are also known, for example from GB 1544839 and U.S. Pat. No. 4,221,606 respectively. It has now been found that by using a phthalocyanine derivative, such as a derivative which contains a basic substituent, a sulphonamido group or an aromatic imide group, together with one or more of a range of anionic surfactants, in phthalocyanine pigment formulations, pigment compositions can be obtained which are effectively stabilised against flocculation and recrystallisation and which exhibit a wide range of improved technological properties such as dispersibility, colour strength, flow properties, gloss and which, when used in printing inks, give inks having low penetration through substrates such as uncoated paper.

Accordingly, the present invention provides a pigment composition comprising (A) a pigmentary phthalocyanine, (B) a phthalocyanine derivative of formula

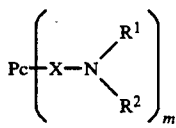

I where Pc is a residue of a metal-free or metal phthalocyanine, X is $-CH_2-$ or $-SO_2-$, $R^1$ and $R^2$ are independently hydrogen, $C_1$ to $C_{20}$ alkyl optionally substituted by hydroxyl, $C_1$ to $C_4$ alkoxy, amino, $C_1$ to $C_{10}$ alkylamino or di($C_1$-$C_{10}$ alkylamino), $C_5$ to $C_{10}$ cycloalkyl, or phenyl, optionally substituted by $C_1$ to $C_4$ alkyl, $C_1$ to $C_4$ alkoxy or halogen, or $R^1$ and $R^2$ together with the indicated nitrogen atom denote a five-, six- or seven-membered heterocyclic ring, or $R^1$ and $R^2$ together denote a group of formula

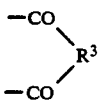

II $R^3$ is an o-phenylene group optionally substituted by $C_1$ to $C_4$ alkyl, $C_1$ to $C_4$ alkoxy, nitro or halogen, and m has an average value from 1 to 5, and (C) at least one anionic surfactant selected from (i) a monovalent metal or ammonium salt of an organic sulphonic acid, (ii) a sulphate half-ester of an alcohol or a monovalent metal or ammonium salt thereof, (iii) a sulphosuccinic acid ester or a monovalent metal or ammonium salt thereof, (iv) a sulphosuccinamic acid or a monovalent metal or ammonium salt thereof, or (v) an aminosulphonic acid or a monovalent metal or ammonium salt thereof.

The phthalocyanine pigment (A) may be metal-free or may contain a metal such as magnesium, aluminium, nickel, iron, zinc, lead, tin or, preferably, copper. It may be further substituted by up to an average of one chlorine or bromine atom, but is preferably not further substituted. An especially preferred pigment (A) is copper phthalocyanine.

In the phthalocyanine derivative (B), the residue Pc may be metal-free or may contain a metal such as those herein before mentioned. The residue Pc may be further substituted by up to an average of one chlorine or bromine atom or one sulphonic acid group. In especially preferred embodiments, Pc is a residue of copper phthalocyanine.

In formula I, $R^1$ and $R^2$ as $C_1$ to $C_{20}$ alkyl may independently be, for example, methyl, ethyl, n-propyl, isopropyl, n-butyl, sec-butyl, tert-butyl, n-pentyl, neopentyl, n-hexyl, n-heptyl, isoheptyl, n-octyl, 2-ethylhexyl, n-decyl, n-undecyl, n-dodecyl, n-tetradecyl, n-hexadecyl, n-heptadecyl, n-octadecyl or n-eicosyl. Examples of $R^1$ and $R^2$ as hydroxyl-substituted alkyl groups are hydroxymethyl, 2-hydroxyethyl, 2-hydroxypropyl, 3-hydroxypropyl and 4-hydroxybutyl groups. Examples of $R^1$ and $R^2$ as $C_1$-$C_4$ alkoxy-substituted alkyl are methoxyethyl, ethoxyethyl, butoxyethyl, methoxypropyl, isopropoxypropyl and methoxybutyl groups. Examples of $R^1$ and $R^2$ as amino-substituted alkyl groups are 2-aminoethyl, 2-aminopropyl, 3-aminopropyl, 4-aminobutyl, 5-aminopentyl, $-CH(CH_3)CH_2CH_2NH_2$, $-CH(CH_3)(CH_2)_3NH_2$, $-CH_2CH(CH_3)CH_2NH_2$, $-CH(C_2H_5)CH_2NH_2$ and $-CH(n-C_4H_9)CH_2NH_2$. Examples of $R^1$ and $R^2$ as alkylamino-substituted alkyl groups are 2-(hexylamino)ethyl, 2-(n-octylamino)ethyl, 2-(ethylhexylamino)ethyl, 2-(decylamino)ethyl, 3-(hexylamino)propyl, 3-(n-octylamino)propyl, 3-(ethylhexylamino)propyl and 3-(n-decylamino)propyl groups. Examples of $R^1$ and $R^2$ as dialkylamino-substituted alkyl groups are 2-(dimethylamino)ethyl, 2-(diethylamino)ethyl, 2-(di-n-propylamino)ethyl, 2-(di-iso-propylamino)ethyl, 2-(di-n-butylamino)ethyl, 3-(dimethylamino)propyl, 3-(diethylamino)propyl, 3-(dibutylamino)propyl, 4-(dimethylamino)butyl, 4-(diethylamino)butyl, 1-(dimethylamino)-2-butyl, 1-(diethylamino)-2-butyl, 1-(dibutylamino)-2-butyl, 1-(dimethylamino)-2-hexyl, 1-(diethylamino)-2-hexyl, 3-(dimethylamino)-2-methylpropyl and 3-(diethylamino)-2-methylpropyl groups.

$R^1$ and $R^2$ as $C_5$ to $C_{10}$ cycloalkyl may be, for example, cyclopentyl, methylcyclopentyl, dimethylcyclopentyl, cyclohexyl, methylcyclohexyl, dimethylcyclohexyl or cycloheptyl. Preferably $R^1$ and $R^2$ as cycloalkyl have 6 to 8 carbon atoms.

$R^1$ and $R^2$ as optionally substituted phenyl may be, for example, phenyl or phenyl substituted by one or two chlorine atoms or by one or two methoxy or ethoxy groups, phenyl being preferred.

When $R^1$ and $R^2$ together with the indicated nitrogen atom in formula I denote a five-, six- or seven-membered heterocyclic ring, this ring may contain an oxygen atom, a sulphur atom or another nitrogen atom as a further ring member. For example, $R^1$ and $R^2$ together may denote a pyrrolidine, piperidine, piperazine, morpholine or thiomorpholine ring which may be substituted on carbon or nitrogen atoms by $C_1$ to $C_4$ alkyl.

When $R^1$ and $R^2$ together denote a group of formula II, $R^3$ may be, for example, o-phenylene or o-phenylene substituted by one or two methyl, ethyl, methoxy, ethoxy or nitro groups or by one or two chlorine atoms, o-phenylene being preferred.

In certain preferred classes of phthalocyanine derivatives of formula I, X is —$CH_2$— and $R^1$ and $R^2$ are independently $C_1$ to $C_{12}$ alkyl, more preferably $C_1$ to $C_4$ alkyl, or $R^1$ and $R^2$ together denote a group of formula II where $R^3$ is o-phenylene or o-phenylene substituted by methyl or chloro. In another preferred class of phthalocyanine derivatives of formula I, X is —$SO_2$—, $R^1$ is hydrogen and $R^2$ is $C_1$ to $C_{12}$ alkyl, more preferably $C_1$ to $C_6$ alkyl, optionally substituted by amino, $C_1$ to $C_4$ alkylamino or di($C_1$-$C_4$ alkyl)amino.

In especially preferred compounds of formula I, X is —$CH_2$— and $R^1$ and $R^2$ are each methyl or $R^1$ and $R^2$ together denote a group of formula II where $R^3$ is o-phenylene. In other especially preferred compounds of formula I, X is —$SO_2$—, $R^1$ is hydrogen and $R^2$ is N,N-dimethyl-3-aminopropyl.

The average value of m in formula I is preferably from 2 to 4.

Phthalocyanine derivatives of formula I where X is —$CH_2$— may be prepared by conventional processes, for example by reacting a phthalocyanine having m chloromethyl substituents with a compound of formula $R^1$—NH—$R^2$ where m, $R^1$ and $R^2$ are as hereinbefore defined. Phthalocyanine derivatives of formula I where X is —$SO_2$— may also be prepared by conventional processes, for example by reacting a phthalocyanine substituted with m sulphonyl chloride groups with a compound of formula $R^1$—NH—$R^2$ where m, $R^1$ and $R^2$ are as hereinbefore defined.

Where the anionic surfactant (C) is a salt, it may be a salt of an alkali metal, usually sodium, lithium or potassium, or an ammonium salt, including substituted ammonium salts derived from primary amines (usually $C_1$-$C_{20}$ alkyl- or hydroxyalkyl- ammonium salts), secondary amines (usually di($C_1$-$C_{20}$ alkyl- or hydroxyalkyl)ammonium salts) or tertiary amines (usually tri($C_1$-$C_{20}$ alkyl or hydroxyalkyl)ammonium salts) and quaternary ammonium salts. Preferred salts are sodium salts, unsubstituted ammonium salts, $C_1$ to $C_{12}$ alkylammonium salts, $C_1$ to $C_6$ hydroxyalkylammonium salts, di($C_1$ to $C_{12}$ alkyl)ammonium salts, di($C_1$ to $C_6$ hydroxyalkyl)ammonium salts, tri($C_1$ to $C_{12}$ alkyl)ammonium salts and tri($C_1$ to $C_6$ hydroxyalkyl)ammonium salts. Especially preferred salts are sodium, unsubstituted ammonium, isopropylammonium, diisopropylammonium, triisopropylammonium, ethanolammonium, diethanolammonium and triethanolammonium salts.

Examples of anionic surfactants (C) (i) are alkali metal or ammonium salts of aliphatic sulphonic acids such as methanesulphonic acid, ethanesulphonic acid, propanesulphonic acid, butanesulphonic acid, hexanesulphonic acid, octanesulphonic acid, decanesulphonic acid, dodecanesulphonic acid, hexadecanesulphonic acid, heptadecanesulphonic acid or octadecanesulphonic acid; and alkali metal and ammonium salts of aromatic sulphonic acids such as benzenesulphonic acid, napthlalene-1- and -2-sulphonic acids, alkyl-substituted benzenesulphonic acids, i.e. benzenesulphonic acids substituted by one or two alkyl groups, each usually having from 1 to 20 carbon atoms, including o- and p-toluenesulphonic acids, xylenesulphonic acids, p-tert-butylbenzenesulphonic acid, hexylbenzenesulphonic acids, octylbenzenesulphonic acids, nonylbenzenesulphonic acids, dodecylbenzenesulphonic acids, hexadecylbenzenesulphonic acids and octadecylbenzenesulphonic acids, bis(benzenesulphonic acids) substituted by one to four alkyl groups each having 1 to 20 carbon atoms, including bis(4-methylbenzenesulphonic acids), bis(4-octylbenzenesulphonic acids), bis(4-dodecylbenzenesulphonic acids), bis(4-octadecylbenzenesulphonic acids), oxybis(4-octylbenzenesulphonic acids), oxybis(4-dodecylbenzenesulphonic acids) and oxybis(4-octadecylbenzenesulphonic acids), and alkylphenolsulphonic acids including 2-hydroxy-4-tert-butylbenzenesulphonic acid, 2-hydroxy-4-nonylbenzenesulphonic acid, 2-hydroxy-4-dodecylbenzenesulphonic acid and 2-hydroxy-4-octadecylbenzenesulphonic acid.

Preferred anionic surfactants (C) (i) are alkali metal and ammonium salts of alkylbenzenesulphonic acids, more preferably alkali metal and ammonium salts of $C_8$-$C_{18}$ alkyl-substituted benzenesulphonic acids and especially sodium and $C_1$-$C_{10}$ alkylammonium salts of dodecylbenzenesulphonic acid.

Examples of anionic surfactants (C) (ii) are alkali metal or ammonium salts of sulphate half esters of aliphatic alcohols, including alkanols having up to 20 carbon atoms, preferred alkanols being those having 8 to 18 carbon atoms such as n-octanol, 2-ethylhexanol, nonyl alcohols, decanols, undecanols, lauryl alcohol, tridecyl alcohols, pentadecanols, hexadecyl alcohols, heptadecyl alcohols, octadecyl alcohols and mixtures thereof, and alkoxylated alkanols, usually ethoxylated alcohols of formula $R^4(OCH_2CH_2)_xOH$ where $R^4$ is alkyl, preferably $C_8$ to $C_{18}$ alkyl such as 2-ethylhexyl, n-decyl, lauryl, tridecyl, myristyl, pentadecyl or mixtures thereof (i.e. derived from mixed alkanols such as $C_{12}$-$C_{15}$ alkanols), and x is 1 to 25, preferably 1 to 10; and alkali metal or ammonium salts of sulphate half esters of aromatic alcohols, preferably alkoxylated, usually ethoxylated, alkylphenols, preferably adducts of ethylene oxide with phenols substituted by $C_8$ to $C_{18}$ alkyl such as n-octyl, 2-ethylhexyl, n-nonyl, n-dodecyl, pentadecyl or octadecyl.

Preferred anionic surfactants (C) (ii) are alkali metal or ammonium salts of sulphate half esters of $C_8$-$C_{18}$ alkanols or of ethoxylated alkylphenols, especially sodium or ammonium salts of lauryl sulphate or of a sulphate half ester of ethoxylated nonylphenol.

Examples of anionic surfactants (C) (iii) are monoalkyl- and dialkyl- sulphosuccinates, such as those of formula $R^5OOC$—$CH_2$—$CH(SO_3H)$—$COOR^6$ where $R^5$ and $R^6$ are independently hydrogen or $C_1$ to $C_{20}$ alkyl but are not both hydrogen, and alkali metal and ammonium salts thereof. Preferred anionic surfactants (C) (iii) are alkali metal and ammonium salts of dialkylsulphosuccinates, more preferably those where each alkyl group has 3 to 18 carbon atoms, such as isopropyl, isobutyl, amyl, hexyl, n-octyl, 2-ethylhexyl, decyl, dodecyl, tridecyl, pentadecyl or octadecyl groups. Especially preferred surfactants C (iii) are sodium and ammonium salts of diisobutylsulphosuccinate.

Examples of anionic surfactants C (iv) are sulphosuccinamic acids of formula

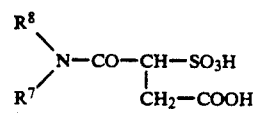

where $R^7$ and $R^8$ are independently aliphatic hydrocarbyl groups, preferably having 8 to 18 carbon atoms, or $R^8$ may alternatively be a hydrogen atom, and their alkali metal and ammonium salts. Preferred anionic surfactants (C) (iv) are alkali metal and ammonium salts of acids of formula III where $R^7$ is hydrogen and $R^8$ is $C_8$ to $C_{18}$ alkyl or $C_8$ to $C_{18}$ alkenyl such as n-octyl, 2-ethylhexyl, decyl, dodecyl, tetradecyl, cetyl, octadecyl, cocoyl, palmityl or oleyl. An especially preferred surfactant C (iv) is disodium N-cocoylsulphosuccinamate.

Examples of surfactants C (v) are aminoethanesulphonic acids such as those of formula

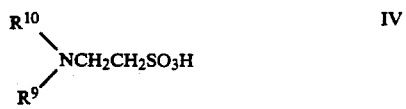

and their alkali metal and ammonium salts, where $R^9$ and $R^{10}$ are independently alkyl, alkenyl, cycloalkyl or acyl, preferably having up to 18 carbon atoms or $R^9$ may alternatively be a hydrogen atom. $R^9$ and $R^{10}$ may be, for example, methyl, ethyl, propyl, butyl, hexyl, octyl, decyl, dodecyl, tetradecyl, hexadecyl, octadecyl, cocoyl, oleyl, cyclohexyl, hexanoyl, octanoyl, decanoyl, palmitoyl or oleoyl. Preferred surfactants (C) (v) are alkali metal and ammonium salts of acids of formula IV where $R^9$ is hydrogen or methyl and $R^{10}$ is $C_8$ to $C_{18}$ alkyl, $C_8$ to $C_{18}$ alkenyl or $C_8$ to $C_{18}$ acyl, especially sodium N-oleyl-N-methyltauride and sodium N-oleoyl-N-methyltauride.

Surfactants C(i), C(ii), C(iii), C(iv), and C(v) are commercially available. Mixtures of two or more of the above mentioned surfactants may be used as (C).

The phthalocyanine derivative (B) is conveniently present in an amount from 0.5 to 20%, preferably 1 to 10%, by weight based on the pigment (A). The anionic surfactant (C) is generally present in an amount of 1 to 20%, preferably 3 to 10%, by weight based on the pigment (A).

Pigment compositions of the invention may be prepared by dry milling a crude phthalocyanine together with the phthalocyanine derivative (B) and the surfactant (C). Dry milling is particularly suitable for the preparation of copper phthalocyanine pigments in which the ultimate pigmentary material comprises 10–90% by weight of the α-phase crystal form.

In an alternative preparation process, a crude phthalocyanine is dry milled together with the phthalocyanine derivative (B) to form a homogenous mixture, this mixture is dispersed in water, usually with the aid of a high speed stirrer, the surfactant (C) is added to the dispersion and mixed therewith, and the resulting mixture is dried, for example using a spray drier, to form a powder, optionally after filtration of the mixture. In a modification of this process, the phthalocyanine derivative (B) and the surfactant (C) are added to an aqueous dispersion of a pigmentary phthalocyanine and mixed therewith and the mixture is filtered (optional) and dried to form a powder.

In another process for the preparation of pigment compositions of the invention, the crude phthalocyanine is wet milled together with the phthalocyanine derivative (B) and the surfactant (C), and the resulting aqueous dispersion is dried, for example using a spray drier, optionally after filtration.

Pigment compositions of the invention may also be prepared by dry or wet blending of the phthalocyanine derivative (B) and the surfactant (C) with pigmentary phthalocyanine which has been prepared by conventional means such as salt grinding or acid pasting of crude phthalocyanine.

The pigment compositions of the invention may also contain minor amounts, for example up to 10% by weight of the composition, of conventional pigment additives, e.g. natural resins such as abietic acid or esters thereof.

Pigment compositions according to the invention are particularly pigmentation of surface coating compositions such as printing inks, especially publication gravure inks. Accordingly, the present invention also provides a surface coating composition, preferably a printing ink, especially a publication gravure ink, pigmented with an effective colouring amount, preferably 1 to 20%, especially 5 to 15%, by weight, based on the total surface coating composition, of a pigment composition of the invention as hereinbefore described.

The surface coating composition may contain, as binder, a natural or synthetic resin such as rosin, shellac, rosin esters, cellulose esters or ethers, epoxy resins, phenolic resins, aminoplasts, polyesters, polyamides, polyacrylates or polystyrenes. Where the surface coating composition is a printing ink, it may contain a liquid vehicle such as an organic liquid conventionally used in printing inks, for example an aromatic hydrocarbon such as benzene, toluene or xylene, a halohydrocarbon such as chlorobenzene, a ketone such as acetone, methyl ethyl ketone, methyl isobutyl ketone, cyclohexanone or acetophenone, an alcohol such as ethanol, isopropanol, n-butanol, ethylene glycol or 2-ethoxyethanol or an ester such as ethyl acetate or 2-ethoxyethyl acetate.

Preparation of the surface coating composition may be carried out in a conventional manner. For example, where it is a printing ink, it may be prepared by dispersing a pigment composition of the invention into a mixture of a resin binder and an organic liquid vehicle in a dispersing apparatus such as ball mill or bead mill which contains grinding material e.g. glass beads.

The invention is illustrated in the following Examples, in which parts and percentages are by weight unless indicated otherwise. In the tests of Examples 7-12, 16-18 and 22-24, dispersion and gloss are determined visually and graded by comparison with the standard levels of the control, + indicating one grade better than standard, + + two grades better than standard, + + + three grades better than standard, + + + + four grades better than standard and = indicating similar to standard. Colour strength is determined visually and by densitometer.

EXAMPLE 1

Crude copper phthalocyanine (89 parts) is dry-milled together with bis(dimethylaminomethyl)-copper phthalocyanine (6 parts) and sodium dodecylbenzenesulphonate (5 parts) to give a particulate pigment composition suitable for use in the pigmentation of printing inks.

EXAMPLE 2

Crude copper phthalocyanine (89 parts) is dry-milled together with bis(dimethylaminomethyl)-copper phthalocyanine (6 parts) and isopropylammonium dodecylbenzenesulphonate (5 parts) to give a particulate pigment composition suitable for the pigmentation of printing inks.

EXAMPLE 3

Crude copper phthalocyanine (84.6 parts) is dry-milled together with bis(dimethylaminomethyl)-copper phthalocyanine (6 parts), sodium lauryl sulphate (4.7 parts) and sodium dodecylbenzenesulphonate (4.7 parts) to give a particulate pigment composition suitable for the pigmentation of printing inks.

EXAMPLE 4

Crude copper phthalocyanine (89 parts) is dry-milled together with bis(dimethylaminomethyl-)copper phthalocyanine (6 parts) and sodium diisobutylsulphosuccinate (5 parts) to give a particulate pigment composition suitable for the pigmentation of printing inks.

EXAMPLE 5

A mixture of crude copper phthalocyanine (89 parts), bis(dimethylaminomethyl)-copper phthalocyanine (6 parts) and sodium N-oleyl-N-methyltauride (5 parts) is dry-milled to give a particulate pigment composition suitable for use in the pigmentation of printing inks.

EXAMPLE 6

Crude copper phthalocyanine (89 parts) is dry-milled together with bis(dimethylaminomethyl)-copper phthalocyanine (6 parts) and an ammonium salt of a sulphate half ester of ethoxylated nonylphenol (5 parts) to give a particulate pigment composition suitable for the pigmentation of printing inks.

EXAMPLES 7-12

Printing inks are prepared from each of the pigment compositions of Examples 1 to 6 as follows:

The pigment composition (12 parts) is mixed, using a high speed stirrer for 15 minutes, into 64 parts of a 50% solution in toluene of ALBERTOL—a phenolic resin available from Hoechst—and 24 parts of toluene. Glass beads having a diameter of 2 mm (100 parts) are added and the mixture is milled for a further 45 minutes. The resulting millbase is reduced to a standard pigmentation (6-9%) using more of the 50% solution of ALBERTOL and toluene to give the final printing ink.

The dispersion, colour strength and gloss properties of the resulting printing inks are compared with those of a control printing ink in which the pigment composition of the invention is replaced by a control pigment composition made by dry-milling a mixture of crude copper phthalocyanine (93.6 parts) and bis(dimethylaminomethyl)-copper phthalocyanine (6.4 parts). The results for the pigment compositions of Examples 1 to 6 and the Control are shown in Table 1.

TABLE 1

| EXAMPLE | PIGMENT COMPOSITION | DISPERSION | COLOUR STRENGTH | GLOSS |
|---|---|---|---|---|
| — | Control | Standard | Standard | Standard |
| 7 | Example 1 | ++ | 10 parts strong | ++ |
| 8 | Example 2 | ++++ | 10 parts strong | ++++ |
| 9 | Example 3 | ++++ | 20 parts strong | +++++ |
| 10 | Example 4 | + | 20 parts strong | +++ |
| 11 | Example 5 | ++ | 15 parts strong | + |
| 12 | Example 6 | + | 10 parts strong | Standard |

EXAMPLE 13

Crude copper phthalocyanine (94 parts) is dry milled together with bis (phthalimidomethyl)-copper phthalocyanine (3 parts) and sodium dodecylbenzenesulphonate (3 parts) to give a particulate pigment composition suitable for use in the pigmentation of printing inks.

EXAMPLE 14

Crude copper phthalocyanine (94 parts) is dry milled together with bis(phthalimidomethyl)-copper phthalocyanine (3 parts) and sodium N-oleyl N-methyltauride (3 parts) to give a particulate pigment composition suitable for use in the pigmentation of printing inks.

EXAMPLE 15

Crude copper phthalocyanine (94 parts) is dry milled together with bis(phthalimidomethyl)-copper phthalocyanine (3 parts) and sodium diisobutylsulphosuccinate (3 parts) to give a particulate pigment composition suitable for use in the pigmentation of printing inks.

EXAMPLES 16-18

Printing inks are prepared from each of the pigment compositions of Examples 13-15 as follows:

The pigment composition (12 parts) is mixed using a high speed stirrer for 15 minutes, into 64 parts of a 50% solution in toluene of ALBERTOL—a phenolic resin available from Hoechst—and 24 parts toluene. Glass beads having a diameter of 2 mm (100 parts) are added and the mixture is milled for a further 45 minutes. The resulting millbase is reduced to a standard pigmentation (6-9%) using more of the 50% solution of ALBERTOL and toluene to give the final printing ink.

The dispersion, colour strength and gloss properties of the resulting printing inks are compared with those of a control pigment composition made by dry-milling a mixture of crude copper phthalocyanine (97 parts) and bis(phthalimidomethyl)-copper phthalocyanine (3 parts). The results for the pigment compositions of examples 13-15 and the control are shown in Table 2.

TABLE 2

| Example | Pigment Composition | Dispersion | Colour Strength | Gloss |
|---|---|---|---|---|
| —. | CONTROL | STANDARD | STANDARD | STANDARD |
| 16 | Example 13 | +++ | = | + |
| 17 | Example 14 | + | 5 parts strong | = |
| 18 | Example 15 | +++ | 10 parts strong | ++ |

EXAMPLE 19

Crude copper pthalocyanine (88 parts) is dry milled together with tris[3-(N,N-dimethylamino)-N$^1$-propylaminosulphonyl]-copper phthalocyanine (i.e. of (formula I where X is —SO$_2$— R$_1$ is H and R$_2$ is ((CH$_2$)$_3$NMe$_2$)) (6 parts) and sodium dodecylbenzensulphonate (6 parts) to give a particulate pigment composition suitable for the pigmentation of printing inks.

EXAMPLE 20

Crude copper pthalocyanine (88 parts) is dry milled together with tris[3-(N,N-dimethylamino)-N$^1$-propylaminosulphonyl]-copper phthalocyanine (6 parts) and sodium N-oleyl-N-methyltauride (6 parts) to give a particulate pigment composition suitable for the pigmentation of printing inks.

EXAMPLE 21

A mixture of crude copper phthalocyanine (88 parts), tris[3-(N,N-dimethylamino)-N$^1$-propylaminosulphonyl]-copper phthalocyanine (6 parts) and sodium diisobutylsulphosuccinate (6 parts) is dry milled to give a particular pigment composition suitable for use in the pigmentation of printing inks.

EXAMPLES 22-24

Printing inks are prepared from each of the pigment compositions of Examples 19-21 as follows:

The pigment composition (12 parts) is mixed, using a high speed stirrer for 15 minutes, into 64 parts of a 50% solution in toluene of ALBERTOL—a phenolic resin available from Hoechst—and 24 parts of toluene. Glass beads having a diameter of 2 mm (100 parts) are added and the mixture is milled for a further 45 minutes. The resulting millbase is reduced to a standard pigmentation (6-9%) using more of the 50% solution of ALBERTOL and toluene to give the final printing ink.

The dispersion, colour strength and gloss properties of the resulting printing inks are compared with those of a control printing ink in which the pigment composition of the invention is replaced by a control pigment composition made by dry milling mixture of crude copper phthalocyanine (94 parts) and tris[3-(N,N-dimethylamino)-$N^1$-propylaminosulphonyl]-copper phthalocyanine (6 parts). The results for the pigment compositions of Examples 19-21 and the control are shown in Table 3.

TABLE 3

| Example | Pigment Composition | Dispersion | Colour Strength | Gloss |
|---|---|---|---|---|
| — | CONTROL | STANDARD | STANDARD | STANDARD |
| 22 | Example 19 | +++ | 5 parts strong | + |
| 23 | Example 20 | ++ | = | + |
| 24 | Example 21 | ++ | = | + |

EXAMPLE 25

Crude copper phthalocyanine (20% w/w aqueous slurry) is wet milled using a DYNOMILL. The resulting slurry, 20% w/w copper phthalocyanine (92 parts) is wet blended with bis(dimethylaminomethyl)-copper phthalocyanine (3 parts) and sodium dodecylbenzenesulphonate (5 parts) to give a particulate pigment composition suitable for use in the pigmentation of printing inks.

Gravure printing inks obtained from the resulting pigment composition by the method described for Examples 7-12 exhibit excellent dispersibility, colour strength, gloss and rheology.

EXAMPLE 26

The procedure of Example 25 is repeated, but using sodium N-oleyl-N-methyltauride (5 parts) in place of the dodecylbenzenesulphonate used in that Example. Gravure printing inks obtained from the resulting pigment composition by the method of Examples 7-12 exhibit excellent dispersibility, colour strength, gloss and rheology.

EXAMPLE 27

The procedure of Example 25 is repeated, but using sodium diisobutylsulphosuccinate (5 parts) in place of the dodecylbenzenesulphonate used in that Example. Gravure printing inks obtained from the resulting pigment composition by the method of Examples 7-12 exhibit excellent dispersibility, colour strength, gloss and rheology.

What is claimed is:

1. A pigment composition comprising (A) a pigmentary phthalocyanine, (B) a phthalocyanine derivative of formula

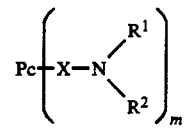

where Pc is a residue of a metal-free or metal phthalocyanine, X is —$CH_2$— or —$SO_2$—, $R^1$ and $R^2$ are independently hydrogen, $C_1$-$C_{20}$ alkyl or $C_1$-$C_{20}$ alkyl substituted by hydroxyl, $C_1$ to $C_4$ alkoxy, amino, $C_1$ to $C_{10}$ alkylamino or di($C_1$ to $C_{10}$alkyl)amino, $C_5$ to $C_{10}$ cycloalkyl, phenyl or phenyl substituted by $C_1$ to $C_4$ alkyl, $C_1$ to $C_4$ alkoxy or halogen, or $R^1$ and $R^2$ together with the indicated nitrogen atom denote a five-, six- or seven-membered heterocyclic ring, or $R^1$ and $R^2$ together denote a group of formula

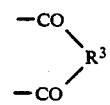

$R^3$ is an o-phenylene group or an o-phenylene group substituted by $C_1$ to $C_4$ alkyl, $C_1$ to $C_4$ alkoxy, nitro or halogen, and m has an average value of 1 to 5, and (C) at least one anionic surfactant selected from the group consisting of (i) a monovalent metal or ammonium salt of an organic sulfonic acid, (ii) a sulfate half-ester of an alcohol or a monovalent metal or ammonium salt thereof, (iii) a sulfosuccinic acid ester or a monovalent metal or ammonium salt thereof, (iv) a sulfosuccinamic acid or a monovalent metal or ammonium salt thereof and (v) an aminosulfonic acid or a monovalent metal or ammonium salt thereof.

2. A composition according to claim 1, in which (A) is copper phthalocyanine.

3. A composition according to claim 1, in which Pc is a residue of a copper phthalocyanine.

4. A composition according to claim 1, in which X is —$CH_2$— and $R^1$ and $R^2$ are independently $C_1$ to $C_{12}$ alkyl or $R^1$ and $R^2$ together denote a group of formula II where $R^3$ is o-phenylene or o-phenylene substituted by methyl or chloro.

5. A composition according to claim 4, in which $R^1$ and $R^2$ are independently $C_1$ to $C_4$ alkyl.

6. A composition according to claim 4, in which $R^1$ and $R^2$ are each methyl or $R^1$ and $R^2$ together denote a group of formula II where $R^3$ is o-phenylene.

7. A composition according to claim 1, in which X is —$SO_2$—, $R^1$ is hydrogen and $R^2$ is $C_1$ to $C_{12}$ alkyl or $C_1$ to $C_{12}$ alkyl substituted by amino, $C_1$ to $C_4$ alkylamino or di($C_1$-$C_4$ alkyl)amino.

8. A composition according to claim 7, in which $R^2$ is 3-(N,N-dimethylamino)propyl.

9. A composition according to claim 1, in which in formula I the average value of m is from 2 to 4.

10. A composition of claim 1 wherein (C) is at least one anionic surfactant selected from the group consisting of a sulfosuccinamic acid or a monovalent metal or ammonium salt thereof and an aminosulfonic acid or a monovalent or ammonium salt thereof.

11. A composition according to claim 10 in which the surfactant (C) is an alkali metal or ammonium salt of a sulfosuccinamic acid of formula

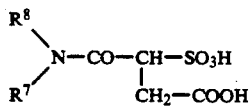

where $R^7$ is hydrogen and $R^8$ is $C_8$ to $C_{18}$ alkyl or $C_8$ to $C_{18}$ alkenyl; an alkali metal or ammonium salt of an aminosulfonic acid of formula

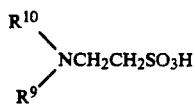

where $R^9$ is hydrogen or methyl and $R^{10}$ is $C_8$ to $C_{18}$ alkyl, $C_8$ to $C_{18}$ alkenyl or $C_8$ to $C_{18}$ acyl; or a mixture of two or more thereof.

12. A composition of claim 1 wherein (C) is an alkali metal or ammonium salt of a $C_8$ to $C_{18}$alkyl-substituted benzenesulfonic acid; an alkali metal or ammonium salt of a sulfate half ester of a $C_8$ to $C_{18}$alkanol or of ethoxylated alkylphenol; an alkali metal or ammonium salt of a dialkylsulfosuccinate where each alkyl group has from 3 to 18 carbon atoms; or a mixture of two or more thereof.

13. A composition according to claim 12, in which (C) is a sodium or $C_1$-$C_{10}$ alkylammonium salt of dodecylbenzenesulfonic acid; a sodium or ammonium salt of lauryl sulfate; a sodium or ammonium salt of a sulfate half ester of ethoxylated nonylphenol; a sodium or ammonium salt of diisobutylsulfosuccinate; or a mixture of two or more thereof.

14. A composition according to claim 1, in which (B) is present in an amount of 0.5 to 20% by weight of the pigment (A).

15. A composition according to claim 14, in which (B) is present in an amount of 1 to 10% by weight of (A).

16. A composition according to claim 1, in which the surfactant (C) is present in an amount of 1 to 20% by weight of the pigment (A).

17. A composition according to claim 16, in which (C) is present in an amount of 3 to 10% by weight of (A).

18. A surface coating composition pigmented with an effective colouring amount of a pigment composition according to claim 1.

19. A composition of claim 11 wherein (C) is disodium N-cocoyl-sulfosuccinamide, sodium N-oleyl-N-methyltauride or N-oleyl-N-methyltauride or a mixture of two or more thereof.

20. A composition according to claim 18, which is a printing ink.

* * * * *